US008285950B2

(12) United States Patent
Fontenot et al.

(10) Patent No.: US 8,285,950 B2
(45) Date of Patent: Oct. 9, 2012

(54) SMT/ECO MODE BASED ON CACHE MISS RATE

(75) Inventors: Nathan D. Fontenot, Georgetown, TX (US); Ryan Patrick Grimm, Austin, TX (US); Monty Christoph Poppe, Austin, TX (US); Joel Howard Schopp, Austin, TX (US); Michael Thomas Strosaker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 306 days.

(21) Appl. No.: 12/792,850

(22) Filed: Jun. 3, 2010

(65) Prior Publication Data

US 2011/0302372 A1 Dec. 8, 2011

(51) Int. Cl.
*G06F 12/00* (2006.01)
(52) U.S. Cl. ...................................... 711/154
(58) Field of Classification Search ........................ None
See application file for complete search history.

(56) References Cited

U.S. PATENT DOCUMENTS

| | | | |
|---|---|---|---|
| 6,381,676 B2 | 4/2002 | Aglietti et al. | |
| 6,604,174 B1 | 8/2003 | Dean et al. | |
| 7,437,513 B2 | 10/2008 | Saida et al. | |
| 7,865,669 B2 * | 1/2011 | Kornegay et al. | 711/138 |
| 2005/0071564 A1 | 3/2005 | Luick | |
| 2007/0150881 A1 * | 6/2007 | Khawand et al. | 717/162 |
| 2010/0030970 A1 | 2/2010 | Qureshi | |

OTHER PUBLICATIONS

Oh et al., "An Analytical Model to study Optimal Area Breakdown between Cores and Caches in a Chip Multiprocessor", IEEE Computer Society Annual Symposium on VLSI, 2009, pp. 181-186.
Zhou et al., "Cache Sharing Management for Performance Fairness in Chip Multiprocessors", IEEE, 18th International Conference on Parallel Architectures and Compilation Techniques, 2009, pp. 384-393.
He et al., "An Instantaneous IPC Based Instruction Fetch Policy for SMT Processors", Chinese Journal of Computers, vol. 30, No. 4, Apr. 2007, pp. 629-637.
Wang et al., "Boosting SMT Trace Processors Performance with Data Cache Missensitive Thread Scheduling Mechanism", 2006, Microprocessors and Microsystems, Netherlands, pp. 225-233.

* cited by examiner

*Primary Examiner* — Hiep Nguyen
(74) *Attorney, Agent, or Firm* — Yee & Associates, P.C.; Steven Bennett

(57) ABSTRACT

A computer implemented method for managing an execution mode for a parallel processor is provided. A monitor identifies a first efficiency rate for a first contested resource of the parallel processor operating in a first operating mode. Responsive to identifying the first efficiency rate for the first contested resource, the monitor identifies whether the first efficiency rate for the contested resource of the parallel processor operating in the first operating mode exceeds a threshold. Responsive to identifying that the efficiency rate for the contested resource exceeds the threshold, an operation of the parallel processor is changed to a second operating mode.

14 Claims, 10 Drawing Sheets

US 8,285,950 B2

SMT/ECO MODE BASED ON CACHE MISS RATE

BACKGROUND

1. Field

The disclosure relates generally to a computer implemented method, a computer program product, and a data processing system. More specifically, the disclosure relates to a computer implemented method, a computer program product, and a data processing system for managing an execution mode for a simultaneous multi-threaded processor.

2. Description of the Related Art

Increasingly large symmetric multi-processor data processing systems are not being used as single large data processing systems. Instead, these types of data processing systems are being partitioned and used as smaller systems. These systems are also referred to as logical partitioned (LPAR) data processing systems. A logical partitioned functionality within a data processing system allows multiple copies of a single operating system or multiple heterogeneous operating systems to be simultaneously run on a single data processing system platform. A partition, within which an operating system image runs, is assigned a non-overlapping subset of the platform's resources. These platform allocable resources include one or more architecturally distinct processors and their interrupt management area, regions of system memory, and input/output (I/O) adapter bus slots. The partition's resources are represented by the platform's firmware to the operating system image.

Each distinct operating system or image of an operating system running within a platform is protected from each other, such that software errors on one logical partition cannot affect the correct operation of any of the other partitions. This protection is provided by allocating a disjointed set of platform resources to be directly managed by each operating system image and by providing mechanisms for ensuring that the various images cannot control any resources that have not been allocated to that image. Furthermore, software errors in the control of an operating system's allocated resources are prevented from affecting the resources of any other image. Thus, each image of the operating system, or each different operating system, directly controls a distinct set of allocable resources within the platform.

With respect to hardware resources in a logical partitioned data processing system, these resources are shared dis-jointly among various partitions. These resources may include, for example, input/output (I/O) adapters, memory DIMMs, non-volatile random access memory (NVRAM), and hard disk drives. Each partition within a logical partitioned data processing system may be booted and shut down over and over without having to power-cycle the entire data processing system.

Parallel processing is a form of computation in which many calculations are carried out simultaneously. Large problems and operations are divided into smaller pieces. These smaller pieces are then solved concurrently, or "in parallel". Parallel processing can be implemented at several different computing levels, including the bit-level, the instruction level, the data level, and task parallelism.

Large problems executing in parallel could theoretically be divided into any number of parallel parts. However, at a certain level of parallelism, the benefits of parallel processing diminish. Beyond a certain level of parallelism, instructions may even require more clock cycles to complete than at a lower level of parallelism. This negative scaling of additional parallel parts is known as parallel slowdown.

Parallel slowdown is typically the result of a communications bottleneck. As more processing nodes are added, that is, as the level of parallelism increases, each processing node spends progressively more time doing communication than useful processing. Beyond a certain level of parallelism, the communications overhead created by adding additional processing nodes, surpasses the increased processing power that those nodes provide. When the loss from communications overhead becomes greater than the increased processing power from additional nodes, parallel slowdown occurs.

SUMMARY

According to one embodiment of the present invention, a computer implemented method for managing an execution mode for a parallel processor is provided. A monitor identifies a first efficiency rate for a first contested resource of the parallel processor operating in a first operating mode. Responsive to identifying the first efficiency rate for the first contested resource, the monitor identifies whether the first efficiency rate for the contested resource of the parallel processor operating in the first operating mode exceeds a threshold. Responsive to identifying that the efficiency rate for the contested resource exceeds the threshold, an operation of the parallel processor is changed to a second operating mode.

DETAILED DESCRIPTION

Figure 1:
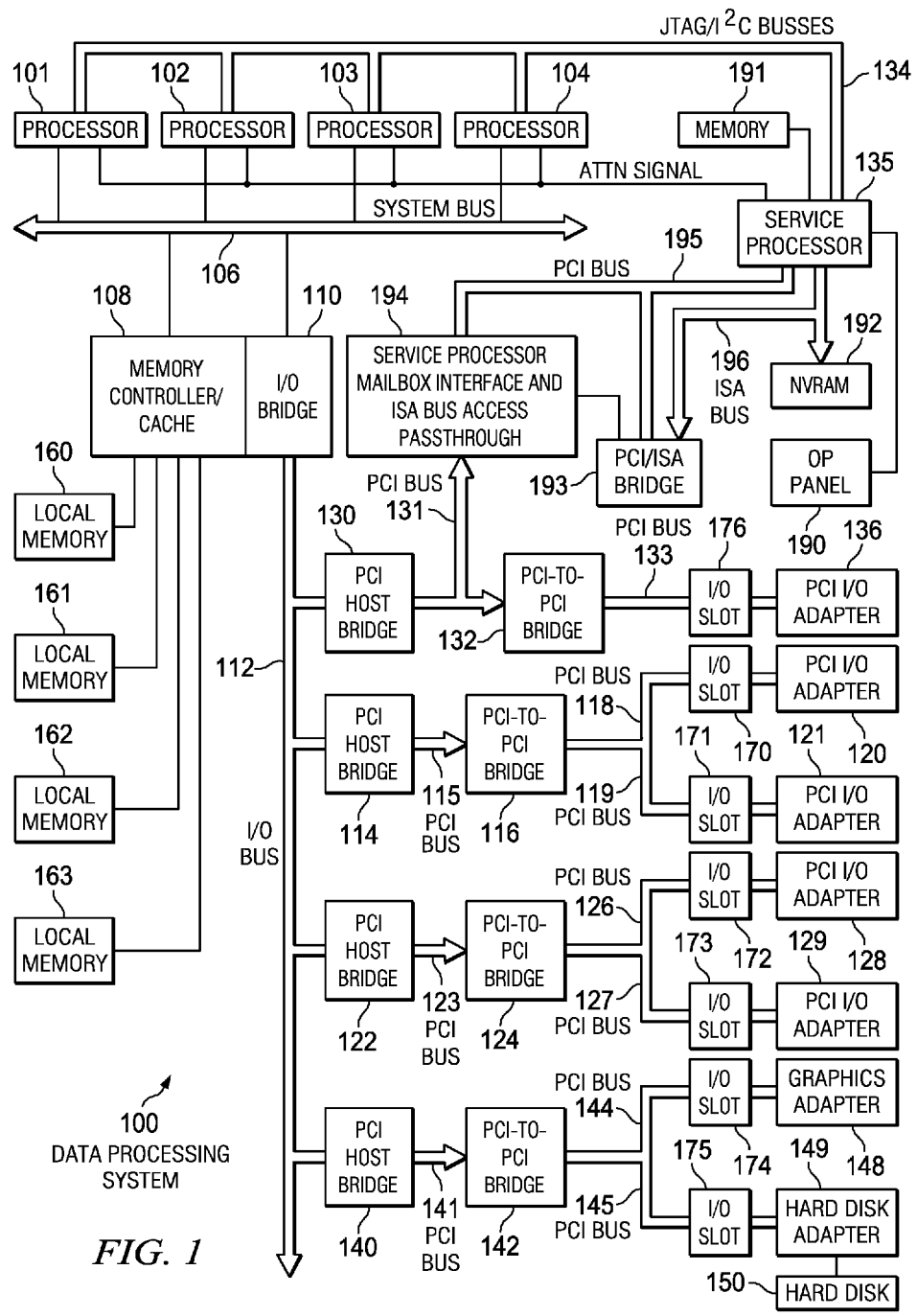
FIG. 1 is a block diagram of a data processing system in which illustrative embodiments may be implemented.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer-usable or computer-readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device.

Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by, or in connection with, the instruction execution system, apparatus, or device. The computer-usable medium may include a propagated data signal with the computer-usable program code embodied therewith, either in baseband, or as part of a carrier wave. The computer-usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

With reference now to the figures, and in particular with reference to FIG. 1, a block diagram of a data processing system in which illustrative embodiments may be implemented is depicted. Data processing system 100 may be a symmetric multiprocessor (SMP) system including processors 101, 102, 103, and 104, which connect to system bus 106. For example, data processing system 100 may be an IBM eServer, a product of International Business Machines Corporation in Armonk, N.Y., implemented as a server within a network. Alternatively, a single processor system may be employed. Also connected to system bus 106 is memory controller/cache 108, which provides an interface to local memories 160, 161, 162, and 163. I/O bridge 110 connects to system bus 106 and provides an interface to I/O bus 112. Memory controller/cache 108 and I/O bridge 110 may be integrated as depicted.

Data processing system 100 is a logical partitioned (LPAR) data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI I/O adapters 120, 121, 128, 129, and 136, graphics adapter 148, and hard disk adapter 149 may be assigned to different logical partitions. In this case, graphics adapter 148 connects to a display device (not shown), while hard disk adapter 149 connects to and controls hard disk 150.

Thus, for example, suppose data processing system 100 is divided into three logical partitions, P1, P2, and P3. Each of PCI I/O adapters 120, 121, 128, 129, and 136, graphics adapter 148, hard disk adapter 149, each of host processors 101, 102, 103, and 104, and memory from local memories 160, 161, 162, and 163 is assigned to each of the three partitions. In these examples, memories 160, 161, 162, and 163 may take the form of dual in-line memory modules (DIMMs). DIMMs are not normally assigned on a per DIMM basis to partitions. Instead, a partition will get a portion of the overall memory seen by the platform. For example, processor 101, some portion of memory from local memories 160, 161, 162, and 163, and I/O adapters 120, 128, and 129 may be assigned to logical partition P1; processors 102 and 103, some portion of memory from local memories 160, 161, 162, and 163, and PCI I/O adapters 121 and 136 may be assigned to partition P2; and processor 104, some portion of memory from local memories 160, 161, 162, and 163, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX) operating system may be executing within partition P1, a second instance (image) of the AIX operating system may be executing within partition P2, and a Linux or OS/400 operating system may be operating within logical partition P3.

Peripheral component interconnect (PCI) host bridge 114 connected to I/O bus 112 provides an interface to PCI local bus 115. PCI I/O adapters 120 and 121 connect to PCI bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations support between four and eight I/O adapters (i.e. expansion slots for add-in connectors). Each PCI I/O adapter 120-121 provides an interface between data processing system 100 and input/output devices such as, for example, other network computers, which are clients to data processing system 100.

An additional PCI host bridge 122 provides an interface for an additional PCI bus 123. PCI bus 123 connects to a plurality of PCI I/O adapters 128 and 129. PCI I/O adapters 128 and 129 connect to PCI bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128-129. Consequently, data processing system 100 allows connections to multiple network computers.

A memory mapped graphics adapter 148 is inserted into I/O slot 174 and connects to I/O bus 112 through PCI bus 144, PCI-to-PCI bridge 142, PCI bus 141, and PCI host bridge 140. Hard disk adapter 149 may be placed into I/O slot 175, which connects to PCI bus 145. In turn, this bus connects to PCI-to-PCI bridge 142, which connects to PCI host bridge 140 by PCI bus 141.

A PCI host bridge 130 provides an interface for PCI bus 131 to connect to I/O bus 112. PCI I/O adapter 136 connects to I/O slot 176, which connects to PCI-to-PCI bridge 132 by PCI bus 133. PCI-to-PCI bridge 132 connects to PCI bus 131. This PCI bus also connects PCI host bridge 130 to the service processor mailbox interface and ISA bus access pass-through 194 and PCI-to-PCI bridge 132. Service processor mailbox interface and ISA bus access pass-through 194 forwards PCI accesses destined to the PCI/ISA bridge 193. NVRAM storage 192 connects to the ISA bus 196. Service processor 135 connects to service processor mailbox interface and ISA bus access pass-through logic 194 through its local PCI bus 195. Service processor 135 also connects to processors 101, 102, 103, and 104 via a plurality of JTAG/I$^2$C busses 134. JTAG/I$^2$C busses 134 are a combination of JTAG/scan busses (see IEEE 1149.1) and Phillips I$^2$C busses. However, alternatively, JTAG/I$^2$C busses 134 may be replaced by only Phillips I$^2$C busses or only JTAG/scan busses. All SP-ATTN signals of the host processors 101, 102, 103, and 104 connect together to an interrupt input signal of service processor 135. Service processor 135 has its own local memory 191 and has access to the hardware OP-panel 190.

When data processing system 100 is initially powered up, service processor 135 uses the JTAG/I$^2$C busses 134 to interrogate the system (host) processors 101, 102, 103, and 104, memory controller/cache 108, and I/O bridge 110. At the completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 101, 102, 103, and 104, memory controller/cache 108, and I/O bridge 110. Any error information for failures detected during the BISTs, BATs, and memory tests are gathered and reported by service processor 135.

If a meaningful and valid configuration of system resources is still possible after taking out the elements found to be faulty during the BISTs, BATs, and memory tests, then data processing system 100 is allowed to proceed to load executable code into local (host) memories 160, 161, 162, and 163. Service processor 135 then releases host processors 101, 102, 103, and 104 for execution of the code loaded into local memory 160, 161, 162, and 163. While host processors 101, 102, 103, and 104 are executing code from respective operating systems within data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 101, 102, 103, and 104, local memories 160, 161, 162, and 163, and I/O bridge 110.

Service processor 135 saves and reports error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for de-configuration during the current running session and future Initial Program Loads (IPLs). IPLs are also sometimes referred to as a "boot" or "bootstrap".

Data processing system 100 may be implemented using various commercially available computer systems. For example, data processing system 100 may be implemented using IBM eServer iSeries Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 1 may vary. For example, other peripheral devices, such as optical disk drives and the like, also may be used in addition to, or in place of, the hardware depicted. The depicted example is not meant to imply architectural limitations with respect to illustrative embodiments.

Figure 2:
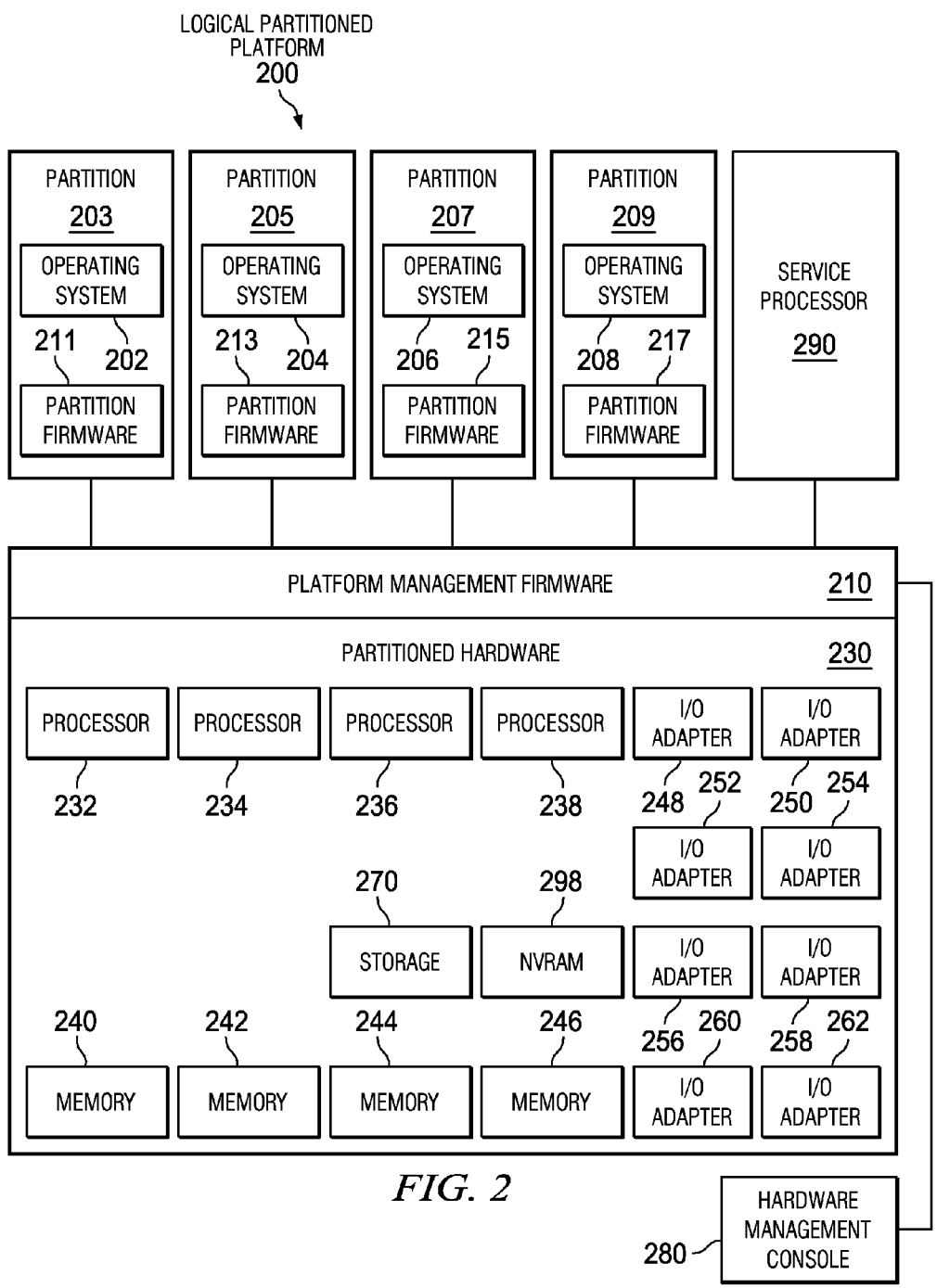
FIG. 2 is a block diagram of an exemplary logical partitioned platform in which illustrative embodiments may be implemented.

With reference now to FIG. 2, a block diagram of an exemplary logical partitioned platform is depicted in which illustrative embodiments may be implemented. The hardware in logical partitioned platform 200 may be implemented as, for example, data processing system 100 in FIG. 1. Logical partitioned platform 200 includes partitioned hardware 230, operating systems 202, 204, 206, 208, and partition management firmware 210. Operating systems 202, 204, 206, and 208 may be multiple copies of a single operating system or multiple heterogeneous operating systems simultaneously run on logical partitioned platform 200. These operating systems may be implemented using OS/400, which are designed to interface with a partition management firmware, such as Hypervisor, which is available from International Business Machines Corporation. OS/400 is used only as an example in these illustrative embodiments. Of course, other types of operating systems, such as AIX and Linux, may be used depending on the particular implementation. Operating systems 202, 204, 206, and 208 are located in partitions 203, 205, 207, and 209. Hypervisor software is an example of software that may be used to implement partition management firmware 210 and is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM).

Additionally, these partitions also include partition firmware 211, 213, 215, and 217. Partition firmware 211, 213, 215, and 217 may be implemented using initial boot strap code, IEEE-1275 Standard Open Firmware, and runtime abstraction software (RTAS), which is available from International Business Machines Corporation. When partitions 203, 205, 207, and 209 are instantiated, a copy of boot strap code is loaded onto partitions 203, 205, 207, and 209 by platform firmware 210. Thereafter, control is transferred to the boot strap code with the boot strap code then loading the open firmware and RTAS. The processors associated or assigned to the partitions are then dispatched to the partition's memory to execute the partition firmware.

Partitioned hardware 230 includes processors 232, 234, 236, and 238, memories 240, 242, 244, and 246, input/output (I/O) adapters 248, 250, 252, 254, 256, 258, 260, and 262, and a storage unit 270. Each of processors 232, 234, 236, and 238, memories 240, 242, 244, and 246, NVRAM storage 298, and I/O adapters 248, 250, 252, 254, 256, 258, 260, and 262 may be assigned to one of multiple partitions within logical partitioned platform 200, each of which corresponds to one of operating systems 202, 204, 206, and 208.

Partition management firmware 210 performs a number of functions and services for partitions 203, 205, 207, and 209 to create and enforce the partitioning of logical partitioned platform 200. Partition management firmware 210 is a firmware implemented virtual machine identical to the underlying hardware. Thus, partition management firmware 210 allows the simultaneous execution of independent OS images 202, 204, 206, and 208 by virtualizing all the hardware resources of logical partitioned platform 200.

Service processor 290 may be used to provide various services, such as processing of platform errors in the partitions. These services also may act as a service agent to report errors back to a vendor, such as International Business Machines Corporation. Operations of the different partitions may be controlled through a hardware management console, such as hardware management console 280. Hardware management console 280 is a separate data processing system from which a system administrator may perform various functions including reallocation of resources to different partitions.

Figure 3:
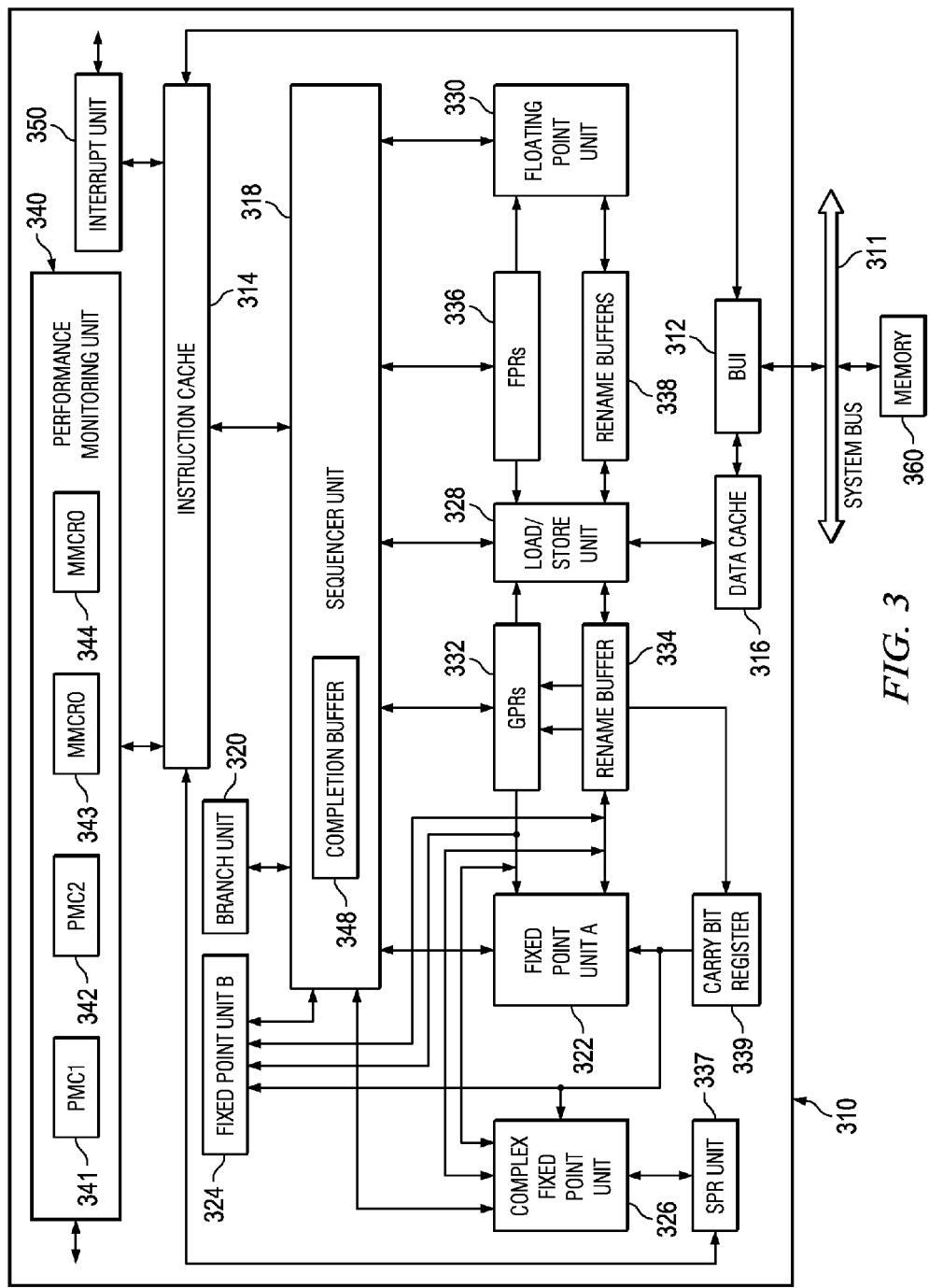
FIG. 3 is a block diagram of a processor system for processing information in which illustrative embodiments may be implemented.

Turning next to FIG. 3, a block diagram of a processor system for processing information is depicted in which illustrative embodiments may be implemented. Processor 310 may be implemented as one or more of processors 101, 102, 103, and 104 in FIG. 1.

In a preferred embodiment, processor 310 is a single integrated circuit superscalar microprocessor. Accordingly, as discussed further herein below, processor 310 includes various units, registers, buffers, memories, and other sections, all of which are formed by integrated circuitry. Also, in the preferred embodiment, processor 310 operates according to reduced instruction set computer ("RISC") techniques. As shown in FIG. 3, system bus 311 is connected to a bus interface unit ("BIU") 312 of processor 310. BIU 312 controls the transfer of information between processor 310 and system bus 311.

BIU 312 is connected to an instruction cache 314 and to data cache 316 of processor 310. Instruction cache 314 outputs instructions to sequencer unit 318. In response to such instructions from instruction cache 314, sequencer unit 318 selectively outputs instructions to other execution circuitry of processor 310.

In addition to sequencer unit 318, in the preferred embodiment, the execution circuitry of processor 310 includes multiple execution units, namely a branch unit 320, a fixed-point unit A ("FXUA") 322, a fixed-point unit B ("FXUB") 324, a complex fixed-point unit ("CFXU") 326, a load/store unit ("LSU") 328, and a floating-point unit ("FPU") 330, FXUA 322, FXUB 324, CFXU 326, and LSU 328 input their source operand information from general-purpose architectural registers ("GPRs") 332 and fixed-point rename buffers 334. Moreover, FXUA 322 and FXUB 324 input a "carry bit" from a carry bit ("CA") register 339. FXUA 322, FXUB 324, CFXU 326, and LSU 328 output results (destination operand information) of their operations for storage at selected entries in fixed-point rename buffers 334. Also, CFXU 326 inputs and outputs source operand information and destination operand information to and from special-purpose register processing unit ("SPR unit") 337.

FPU 330 inputs its source operand information from floating-point architectural registers ("FPRs") 336 and floating-point rename buffers 338. FPU 330 outputs results (destination operand information) of its operation for storage at selected entries in floating-point rename buffers 338.

In response to a Load instruction, LSU 328 inputs information from data cache 316 and copies such information to selected ones of rename buffers 334 and 338. If such information is not stored in data cache 316, then data cache 316 inputs (through BIU 312 and system bus 311) such information from a system memory 360 connected to system bus 311. Moreover, data cache 316 is able to output (through BIU 312 and system bus 311) information from data cache 316 to system memory 360 connected to system bus 311. In response to a Store instruction, LSU 328 inputs information from a selected one of GPRs 332 and FPRs 336 and copies such information to data cache 316.

Sequencer unit 318 inputs and outputs information to and from GPRs 332 and FPRs 336. From sequencer unit 318, branch unit 320 inputs instructions and signals indicating a present state of processor 310. In response to such instructions and signals, branch unit 320 outputs (to sequencer unit 318) signals indicating suitable memory addresses storing a sequence of instructions for execution by processor 310. In response to such signals from branch unit 320, sequencer unit 318 inputs the indicated sequence of instructions from instruction cache 314. If one or more of the sequence of instructions is not stored in instruction cache 314, then instruction cache 314 inputs (through BIU 312 and system bus 311) such instructions from system memory 360 connected to system bus 311.

In response to the instructions input from instruction cache 314, sequencer unit 318 selectively dispatches the instructions to selected ones of execution units 320, 322, 324, 326, 328, and 330. Each execution unit executes one or more instructions of a particular class of instructions. For example, FXUA 322 and FXUB 324 execute a first class of fixed-point mathematical operations on source operands, such as addition, subtraction, ANDing, ORing and XORing. CFXU 326 executes a second class of fixed-point operations on source operands, such as fixed-point multiplication and division. FPU 330 executes floating-point operations on source operands, such as floating-point multiplication and division.

As information is stored at a selected one of rename buffers 334, such information is associated with a storage location (e.g. one of GPRs 332 or carry bit (CA) register 339) as specified by the instruction for which the selected rename buffer is allocated. Information stored at a selected one of rename buffers 334 is copied to its associated one of GPRs 332 (or CA register 339) in response to signals from sequencer unit 318. Sequencer unit 318 directs such copying of information stored at a selected one of rename buffers 334 in response to "completing" the instruction that generated the information. Such copying is called "writeback."

As information is stored at a selected one of rename buffers 338, such information is associated with one of FPRs 336. Information stored at a selected one of rename buffers 338 is copied to its associated one of FPRs 336 in response to signals from sequencer unit 318. Sequencer unit 318 directs such copying of information stored at a selected one of rename buffers 338 in response to "completing" the instruction that generated the information.

Processor 310 achieves high performance by processing multiple instructions simultaneously at various ones of execution units 320, 322, 324, 326, 328, and 330. Accordingly, each instruction is processed as a sequence of stages, each being executable in parallel with stages of other instructions. Such a technique is called "pipelining." In a significant aspect of the illustrative embodiment, an instruction is normally processed as six stages, namely fetch, decode, dispatch, execute, completion, and writeback.

In the fetch stage, sequencer unit 318 selectively inputs (from instruction cache 314) one or more instructions from one or more memory addresses storing the sequence of instructions discussed further hereinabove in connection with branch unit 320, and sequencer unit 318.

In the decode stage, sequencer unit 318 decodes up to four fetched instructions.

In the dispatch stage, sequencer unit 318 selectively dispatches up to four decoded instructions to selected (in response to the decoding in the decode stage) ones of execution units 320, 322, 324, 326, 328, and 330 after reserving rename buffer entries for the dispatched instructions' results (destination operand information). In the dispatch stage, operand information is supplied to the selected execution units for dispatched instructions. Processor 310 dispatches instructions in order of their programmed sequence.

In the execute stage, execution units execute their dispatched instructions and output results (destination operand information) of their operations for storage at selected entries in rename buffers 334 and rename buffers 338 as discussed further hereinabove. In this manner, processor 310 is able to execute instructions out-of-order relative to their programmed sequence.

In the completion stage, sequencer unit 318 indicates an instruction is "complete." Processor 310 "completes" instructions in order of their programmed sequence.

In the writeback stage, sequencer 318 directs the copying of information from rename buffers 334 and 338 to GPRs 332 and FPRs 336, respectively. Sequencer unit 318 directs such copying of information stored at a selected rename buffer. Likewise, in the writeback stage of a particular instruction, processor 310 updates its architectural states in response to the particular instruction. Processor 310 processes the respective "writeback" stages of instructions in order of their programmed sequence. Processor 310 advantageously merges an instruction's completion stage and writeback stage in specified situations.

In the illustrative embodiment, each instruction requires one machine cycle to complete each of the stages of instruction processing. Nevertheless, some instructions (e.g., complex fixed-point instructions executed by CFXU 326) may require more than one cycle. Accordingly, a variable delay may occur between a particular instruction's execution and completion stages in response to the variation in time required for completion of preceding instructions.

Completion buffer 348 is provided within sequencer 318 to track the completion of the multiple instructions which are being executed within the execution units. Upon an indication that an instruction or a group of instructions have been completed successfully, in an application specified sequential order, completion buffer 348 may be utilized to initiate the transfer of the results of those completed instructions to the associated general-purpose registers.

In addition, processor 310 also includes performance monitor unit 340, which is connected to instruction cache 314 as well as other units in processor 310. Operation of processor 310 can be monitored utilizing performance monitor unit 340, which in this illustrative embodiment is a software-accessible mechanism capable of providing detailed information descriptive of the utilization of instruction execution resources and storage control. Although not illustrated in FIG. 3, performance monitor unit 340 is coupled to each functional unit of processor 310 to permit the monitoring of all aspects of the operation of processor 310, including, for example, reconstructing the relationship between events, identifying false triggering, identifying performance bottlenecks, monitoring pipeline stalls, monitoring idle processor cycles, determining dispatch efficiency, determining branch efficiency, determining the performance penalty of misaligned data accesses, identifying the frequency of execution of serialization instructions, identifying inhibited interrupts, and determining performance efficiency. The events of interest also may include, for example, time for instruction decode, execution of instructions, branch events, cache misses, and cache hits.

Performance monitor unit 340 includes an implementation-dependent number (e.g., 2-8) of counters 341-342, labeled PMC1 and PMC2, which are utilized to count occurrences of selected events. Performance monitor unit 340 further includes at least one monitor mode control register (MMCR). In this example, two control registers, MMCRs 343 and 344 are present that specify the function of counters 341-342. Counters 341-342 and MMCRs 343-344 are preferably implemented as SPRs that are accessible for read or write via MFSPR (move from SPR) and MTSPR (move to SPR) instructions executable by CFXU 326. However, in one alternative embodiment, counters 341-342 and MMCRs 343-344 may be implemented simply as addresses in I/O space. In another alternative embodiment, the control registers and counters may be accessed indirectly via an index register.

This embodiment is implemented in the IA-64 architecture in processors from Intel Corporation.

The various components within performance monitoring unit 340 may be used to generate data for performance analysis. Depending on the particular implementation, the different components may be used to generate trace data. In other illustrative embodiments, performance unit 340 may provide data for time profiling with support for dynamic address to name resolution.

Additionally, processor 310 also includes interrupt unit 350, which is connected to instruction cache 314. Additionally, although not shown in FIG. 3, interrupt unit 350 is connected to other functional units within processor 310. Interrupt unit 350 may receive signals from other functional units and initiate an action, such as starting an error handling or trap process. In these examples, interrupt unit 350 is employed to generate interrupts and exceptions that may occur during execution of a program.

The illustrative embodiments as described herein provide a method for optimizing parallel processes by monitoring the congestion levels in contested resources. A contested resource is monitored for parallel congestion. If the parallel congestion of the contested resource exceeds a congestion threshold, the process switches to a different level of parallelism. The efficiency of the new level of parallelism is compared to the efficiency of the previous level of parallelism. If the new level of parallelism is not more efficient than the previous level of parallelism, the process returns to the previous level of parallelism.

Figure 4:
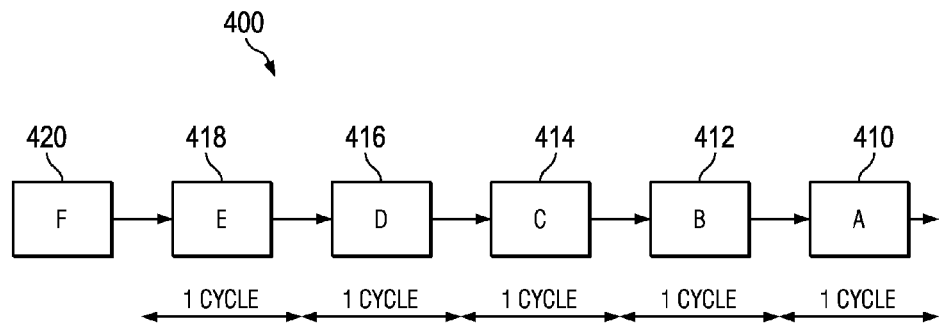
FIG. 4 is a schematic of an instruction pipeline in which illustrative embodiments may be implemented.

Referring now to FIG. 4, a schematic of an instruction pipeline is shown in which illustrative embodiments may be implemented. Instruction pipeline 400 is an ordered stream of instructions that execute on a processor, such as processor 310 of FIG. 3.

Instruction pipeline 400 comprises execution stages 410-420. Each of execution stages 410-420 operates on the instruction before passing the instruction to the subsequent one of execution stages 410-420. Typically, each execution stage requires one clock cycle to complete.

Modern processors support multiple instruction pipelines, such as instruction pipeline 400, which allows independent instructions to be executed in parallel. Thus, the addition of multiple pipelines increases the parallelism that is effectuated on the processor. For example, recent PowerPC processors, such as the POWER7 processor available from International Business Machines, Inc., supports two pipelines for executing the instructions which access storage, including loading and storing registers to and from the cache. The POWER7 processor also supports two pipelines for executing arithmetic instructions on the contents of registers, such as ADD, SUBTRACT, COMPARE, and AND. The POWER7 processor also supports a pipeline for branch instructions, and another pipeline for parallel support of floating-point and vector operations.

While instruction pipeline 400 can theoretically execute each of execution stages 410-420 in a single clock cycle, in practice, the number of cycles is typically much greater. Instruction dependency delays and cache misses will often cause a delay in the execution of one execution stages 410-420. This delay can be up to hundreds of clock cycles. During this delay, a single threaded instruction pipeline will remain inactive while the instruction dependency delay or cache miss is resolved.

Multi-thread enabled processors and other parallel processing techniques allow the processor core to execute instructions for other threads during this delay time. However, with the additional parallelism, certain hardware capabilities become contested resources among the parallel threads, with each thread competing for a portion of the limited hardware capabilities.

Figure 5:
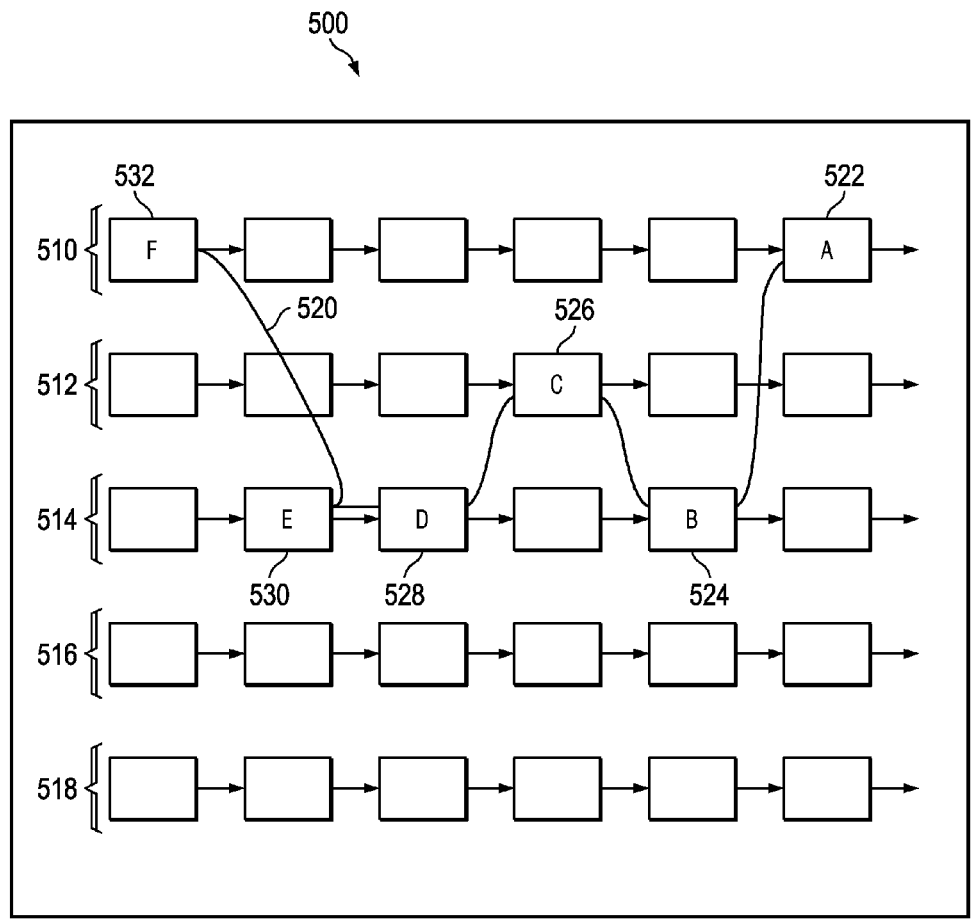
FIG. 5 is a schematic of a single thread executing among a plurality of instruction pipelines within a processor in which illustrative embodiments may be implemented.

Referring now to FIG. 5, a schematic of a single thread executing among a plurality of instruction pipelines within a processor is shown in which illustrative embodiments may be implemented. Processor 500 is a processor, such as processor 310 of FIG. 3. Processor 500 includes instruction pipelines 510-518.

Processor 500 has a single thread executing in instruction pipelines 510-518. Thread 520 includes execution stages 522-532. Each of execution stages 522-532 is an execution stage of the instruction sequence for thread 520. Each of execution stages 522-530 is an execution stage such as execution stages 410-420 of FIG. 4.

Figure 6:
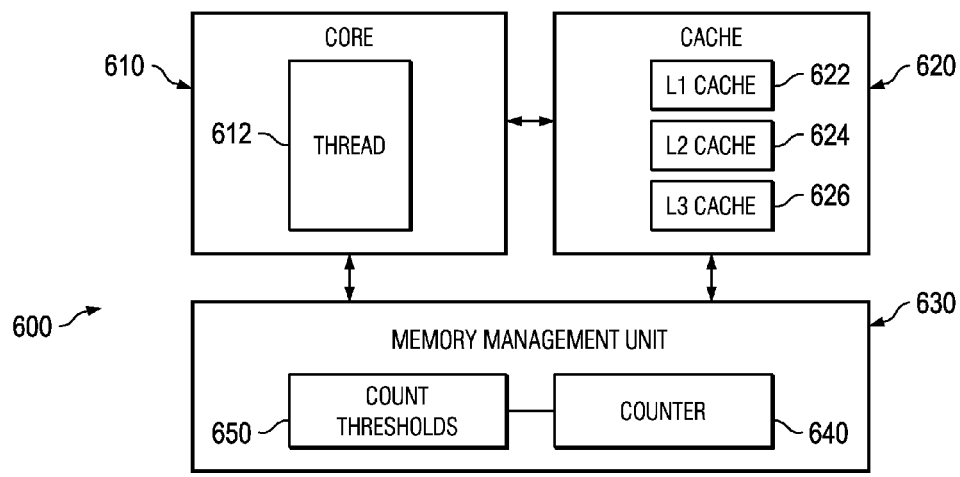
FIG. 6 is a data flow for a memory system for a single thread enabled processor in which illustrative embodiments may be implemented.

Referring now to FIG. 6, a data flow for a memory system for a single thread enabled processor is shown according to an illustrative embodiment shown. The memory system 600 of FIG. 6 is a cache memory system for a single thread executing among a plurality of instruction pipelines within a processor, such as processor 500 of FIG. 5.

Core 610 is a relatively large, general-purpose logic function within a processor, such as processor 500 of FIG. 5. Thread 612 runs in core 610. Thread 612 is thread 520 of FIG. 5. Thread 610 is a sequence of code, this code is often responsible for one aspect of the program, or one task given to the program. Thread 610 is a portion of a process that can run independently of, and concurrently with, other portions of that process. Each process is made of one or more threads.

Cache 620 is associated with core 610. Cache 620 is a cache such as instruction cache 314 and to data cache 316 of FIG. 3. Cache 620 may be comprised of multiple cache levels, such as for example, but not limited to, L1 cache 622, an L2 cache 624, and an L3 cache 626.

Thread 612 is allocated a portion of cache 620, including a portion of each of the multiple cache levels. Because core 610 is running only thread 612, thread 612 is allocated the entire portion of cache 620. That is, because core 610 is running only thread 612, cache 620, including L1 cache 622, an L2 cache 624, and an L3 cache 626, is an uncontested resource.

Memory system 600 includes memory management unit 630. Memory management unit 630 is a computer hardware component responsible for handling accesses to memory requested by core 610. Memory management unit 630 provides memory access protection and virtual-to-real memory address translation.

Memory management unit 630 includes counter 640. Counter 640 is a counter that tracks a number of cache misses in cache 620. In one illustrative embodiment, counter 620 tracks the number of cache misses in L2 cache 624 and L3 cache 626 of cache 620.

Cache misses as counted by counter 640 are compared to count thresholds 650. Count thresholds are upper count values and lower count values. Should the cache misses as counted by counter 640 exceed either of the upper count values and lower count values of count threshold 650, core 610 can switch to a different level of parallelism.

For example, should the cache misses as counted by counter 640 exceed the lower count value of count threshold 650, core 610 can add additional layers of parallelism by switching from a lower SMT mode to a higher SMT mode. In the present case, core 610 might switch from a single thread mode shown in FIG. 6, to an SMT2 mode shown in FIG. 8, or even to an SMT4 mode shown in FIG. 10. When the cache miss rate for L2 cache 624 and L3 cache 626 is low, core 610 likely is able to effectively utilize additional levels of parallelism resulting in an increase in overall computes. Competition for the contested resource among the existing levels of parallelism is not hampering throughput. Therefore, overall computes may be increased by increasing parallelism and the contention for a contested resource. In this case, the number of parallel threads could be increased, resulting in a better pipeline utilization for the existing threads and additional threads. The increased pipeline utilization could offset the increased number of cache misses due to the decreased cache size available to the increased number of threads.

Figure 7:
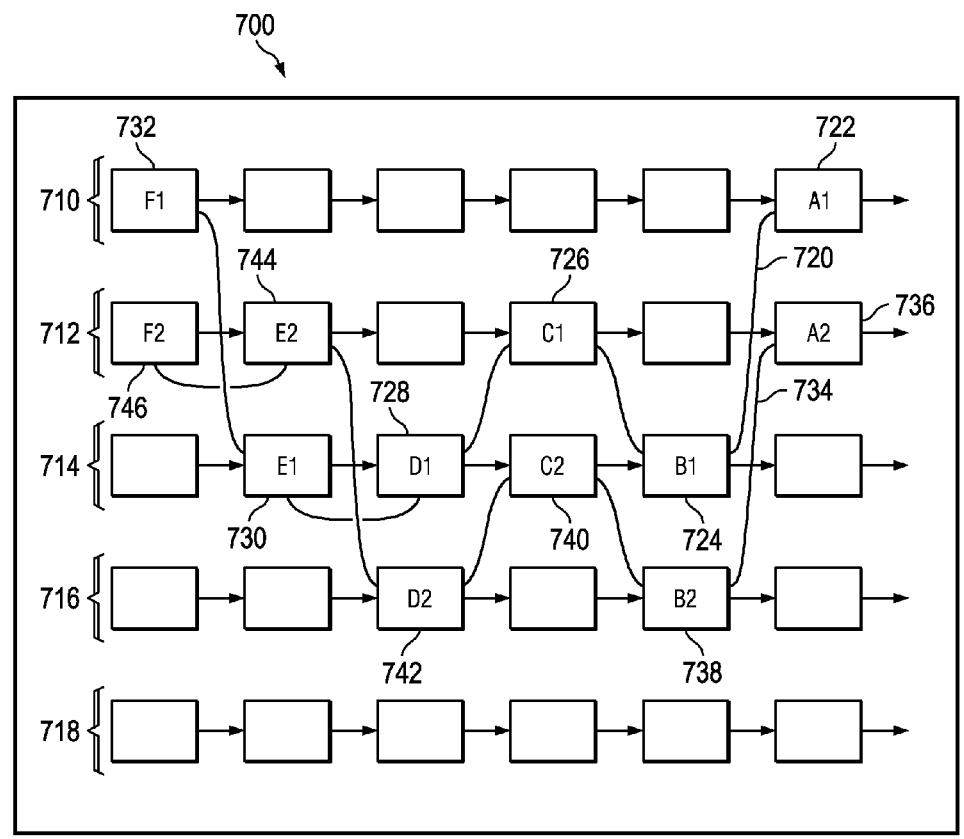
FIG. 7 is schematic of two threads executing among a plurality of instruction pipelines within an SMT2 enabled processor in which illustrative embodiments may be implemented.

Referring now to FIG. 7, a schematic of two threads executing among a plurality of instruction pipelines within an SMT2 enabled processor is shown in which illustrative embodiments may be implemented. Processor 700 is a processor, such as processor 310 of FIG. 3. Processor 700 includes instruction pipelines 710-718.

Processor 700 has two threads executing in instruction pipelines 710-718. Thread 720 includes execution stages 722-732. Each of execution stages 722-732 is an execution stage of the instruction sequence for thread 720. Each of execution stages 722-732 is an execution stage such as execution stages 410-420 of FIG. 4. Thread 734 includes execution stages 736-746. Each of execution stages 736-746 is an execution stage of the instruction sequence for thread 734. Each of execution stages 736-746 is an execution stage such as execution stages 410-420 of FIG. 4.

Figure 8:
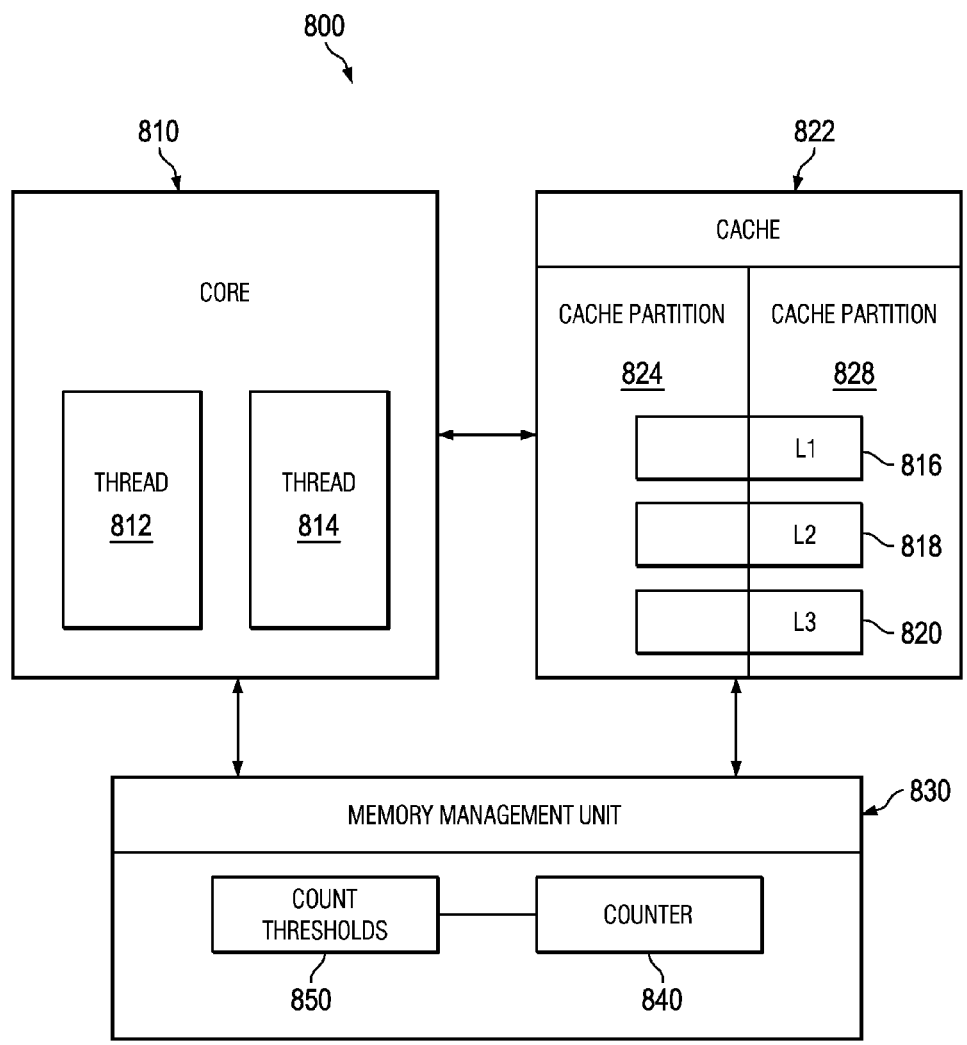
FIG. 8 is a data flow for a memory system for a SMT2 enabled processor in which illustrative embodiments may be implemented.

Referring now to FIG. 8, a data flow for a memory system for a SMT2 enabled processor is shown in which illustrative embodiments may be implemented. The memory system 800 of FIG. 8 is a cache memory system for a single thread executing among a plurality of instruction pipelines within a processor, such as processor 700 of FIG. 7.

Core 810 is similar to core 610 of FIG. 6. Threads 812 and 814 run in core 810 utilizing a simultaneous multi-threading protocol. Thread 812 and thread 814 are thread 720 and thread 734 of FIG. 7. Each of threads 812 and 814 is a sequence of code, this code is often responsible for one aspect of the program, or one task given to the program. Each of threads 812 and 814 is a portion of a process that can run independently of, and concurrently with, other portions of that process. Each process is made of one or more threads.

Cache 822 is associated with core 810. Cache 822 is a cache such as instruction cache 314 and to data cache 316 of FIG. 3. Cache 822 may be comprised of multiple cache levels, such as for example, but not limited to, L1 cache 816, an L2 cache 818, and an L3 cache 820.

Each of threads 812-814 are allocated a portion of cache 822, including a portion of each of the multiple cache levels. Thread 812 is allocated cache partition 824, while thread 814 is allocated cache partition 828. The portion of cache 822 allocated to each of threads 812 and 814 executing within core 810 may or may not be proportional to the number of executing threads, or the relative overhead required by each of the threads.

In FIG. 8, cache 822 is a contested resource. That is, cache 822 provides a limited quantity of cache memory. Each thread executing within core 810 competes with other threads for available cache memory.

Given the same physical resources, on average, each of cache partitions 824 and 828 contain half of the cache resources of a cache having only a single partition, such as cache 620 FIG. 6. Therefore, each of partitions 824 and 828 will contain significantly less data and instructions than would cache 620 of FIG. 6. While core 810 experiences an increase in compute due to better utilization of the pipelines, each of threads 812 and 814 experience an offsetting increase in cycle time due to an increased number of cache misses as compared to a single thread having an undivided larger cache, such as thread 612 and cache 620 of FIG. 6. The efficiency gained by the additional level of parallelism is therefore a balance between the increased utilization of the pipelines of the processor, and the decreased storage size of the cache that is allocated to threads executing on those pipelines.

Memory system 800 includes memory management unit 830. Memory management unit 830 is a computer hardware component responsible for handling accesses to memory requested by core 810. Memory management unit 830 provides memory access protection and virtual-to-real memory address translation.

Memory management unit 830 includes counter 840. Counter 840 is a counter that tracks a number of cache misses in cache 822 over a period of time. In one illustrative embodiment, counter 840 tracks the number of cache misses in L2 cache 818 and L3 cache 820 of cache 822 over a predetermined time period. Each cache miss in L2 cache 818 results in an elapse of more clock cycles as the requested data or instruction must be retrieved from L3 cache 820. Each cache miss in L3 cache 820 results in an elapse of more clock cycles as the requested data or instruction must be retrieved from even larger and slower main memory, such as a hard disk 150 of FIG. 1.

Cache misses as counted by counter 840 are compared to count thresholds 850. Count thresholds are upper count values and lower count values. Should the cache misses as counted by counter 840 exceed either of the upper count values and lower count values of count threshold 850, core 810 can switch to a different level of parallelism.

For example, should the cache misses as counted by counter 840 exceed the lower count value of count threshold 850, core 810 can add additional layers of parallelism by switching from a lower SMT mode to a higher SMT mode. In the present case, core 810 might switch from the SMT2 mode shown in FIG. 8, to an SMT4 mode shown in FIG. 10. When the cache miss rate for L2 cache 818 and L3 cache 820 is low, core 810 likely is able to effectively utilize additional levels of parallelism resulting in an increase in overall computes. Competition for the contested resource among the existing levels of parallelism is not hampering throughput. Therefore, overall computes may be increased by increasing parallelism and the contention for a contested resource. In this case, the number of parallel threads could be increased, resulting in a better pipeline utilization for the existing threads and additional threads. The increased pipeline utilization could offset the increased number of cache misses due to the decreased cache size available to the increased number of threads.

Contrarily, should the cache misses as counted by counter 840 exceed the upper count value of count threshold 850, core 810 can remove layers of parallelism by switching from a higher SMT mode to a lower SMT mode. When the cache miss rate for L2 cache 818 and L3 cache 820 is high, memory management unit 830 is likely to spend many clock cycles retrieving uncached memory pages from main memory. Therefore, overall computes may be increased by reducing parallelism and the contention for a contested resource. In this case, the number of parallel threads could be reduced, resulting in a larger cache size for the remaining threads, and a corresponding decrease in the number of cache misses due to the increased cache size available to the remaining threads Referring now to FIG. 9, a schematic of four threads executing among a plurality of instruction pipelines within an SMT4 enabled processor is shown in which illustrative embodiments may be implemented. Processor 900 is a processor, such as processor 310 of FIG. 3. Processor 900 includes instruction pipelines 910-918.

Processor 900 has four threads executing in instruction pipelines 910-918. Thread 920 includes execution stages 922-932. Each of execution stages 922-932 is an execution stage of the instruction sequence for thread 920. Each of execution stages 922-932 is an execution stage such as execution stages 410-420 of FIG. 4.

Thread 934 includes execution stages 936-946. Each of execution stages 936-946 is an execution stage of the instruction sequence for thread 934. Each of execution stages 936-946 is an execution stage such as execution stages 410-420 of FIG. 4.

Thread 948 includes execution stages 950-960. Each of execution stages 950-960 is an execution stage of the instruction sequence for thread 948. Each of execution stages 950-960 is an execution stage such as execution stages 410-420 of FIG. 4.

Thread 962 includes execution stages 964-974. Each of execution stages 964-974 is an execution stage of the instruction sequence for thread 962. Each of execution stages 964-974 is an execution stage such as execution stages 410-420 of FIG. 4.

Figure 9:
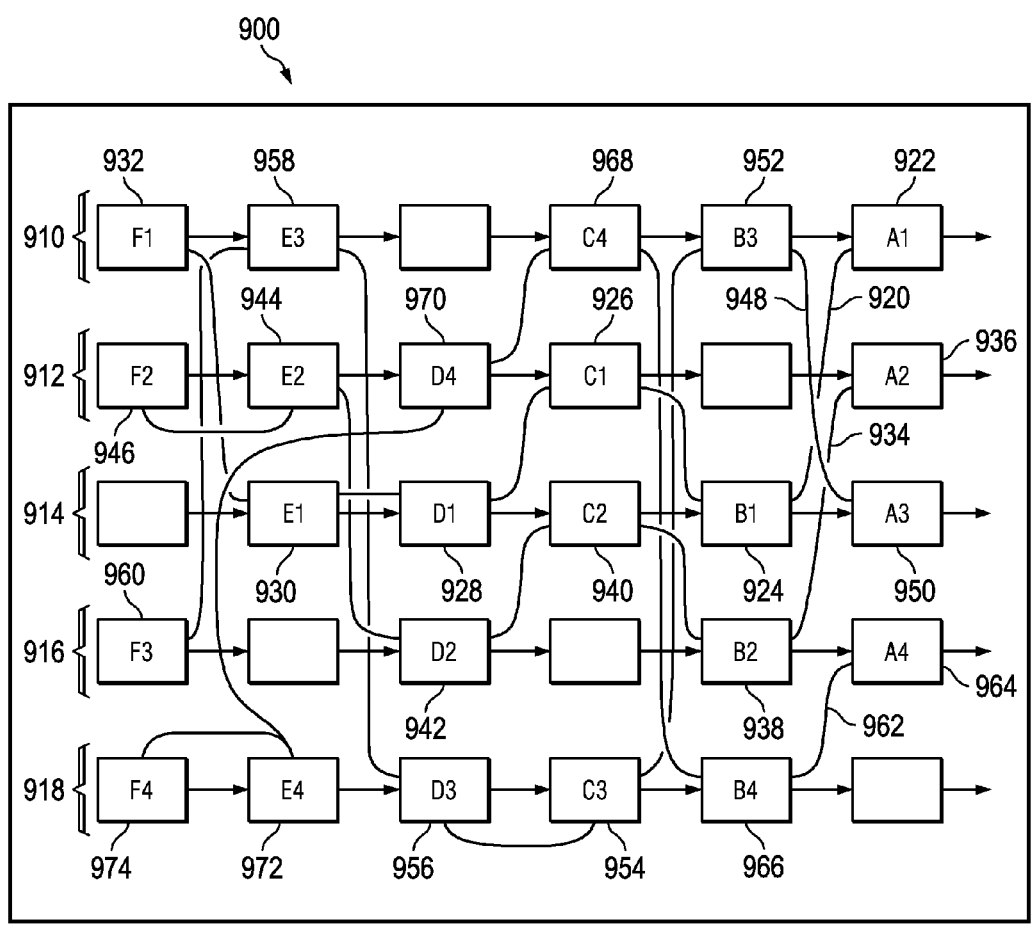
FIG. 9 is a schematic of four threads executing among a plurality of instruction pipelines within an SMT4 enabled processor in which illustrative embodiments may be implemented.
Figure 10:
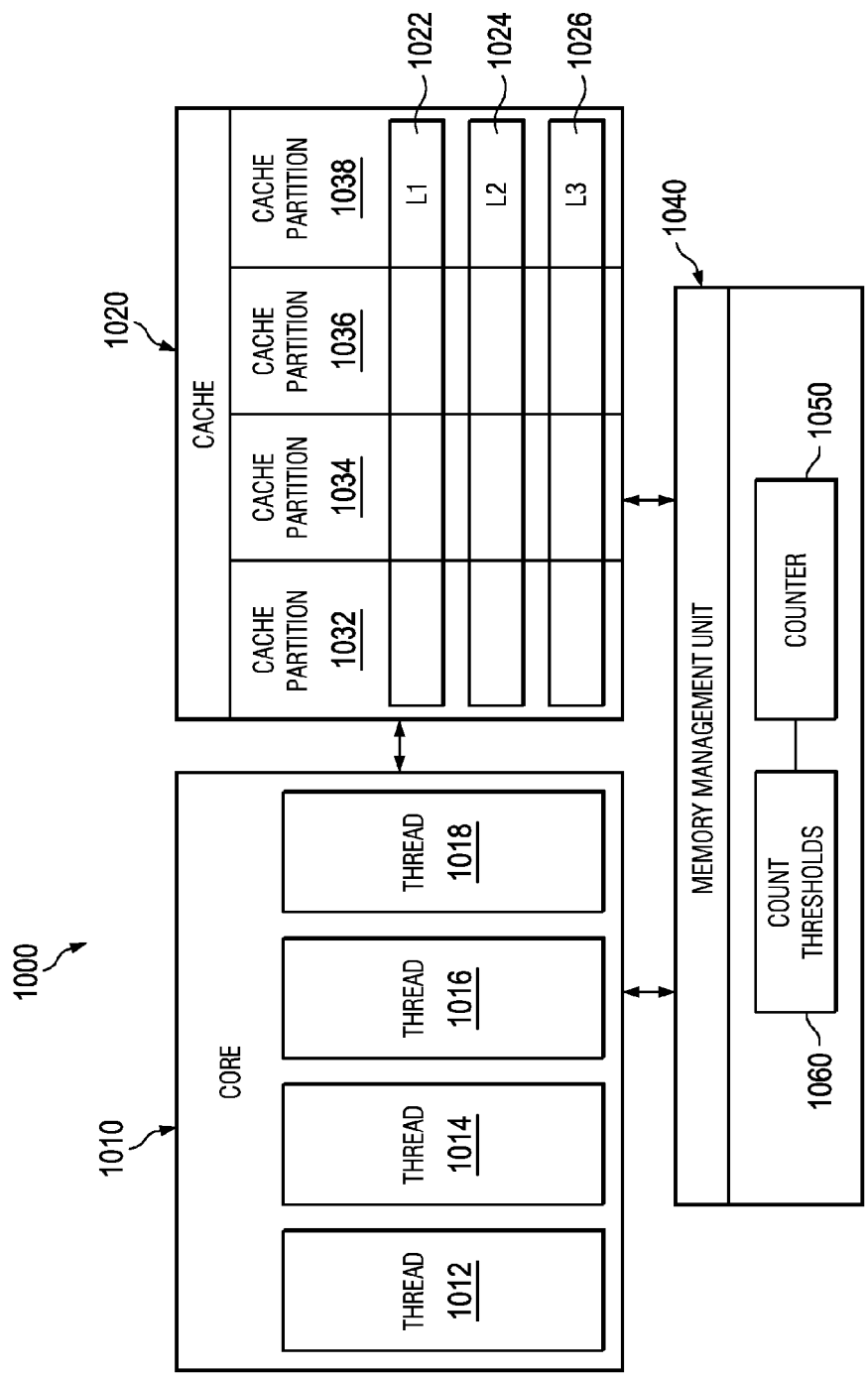
FIG. 10 is a data flow for a memory system for a SMT4 enabled processor according in which illustrative embodiments may be implemented.

Referring now to FIG. 10, a data flow for a memory system for a SMT4 enabled processor is shown in which illustrative embodiments may be implemented. The memory system 1000 of FIG. 10 is a cache memory system for a single thread executing among a plurality of instruction pipelines within a processor, such as processor 900 of FIG. 9.

Core 1010 is similar to core 610 of FIG. 6. Threads 1012-1018 run in core 1010 utilizing a simultaneous multi-threading protocol. Threads 1012-1018 are threads 920, 934, 948, and 962 of FIG. 9. Each of threads 1012-1018 is a sequence of code, this code is often responsible for one aspect of the program, or one task given to the program. Each of threads 1012-1018 is a portion of a process that can run independently of, and concurrently with, other portions of that process. Each process is made of one or more threads.

Cache 1020 is associated with core 1010. Cache 1020 is a cache such as instruction cache 314 and to data cache 316 of FIG. 3. Cache 1020 may be comprised of multiple cache levels, such as for example, but not limited to, L1 cache 1022, an L2 cache 1024, and an L3 cache 1026.

Each of threads 1012-1018 are allocated a portion of cache 1020, including a portion of each of the multiple cache levels. Thread 1012 is allocated cache partition 1032. Thread 1014 is allocated cache partition 1034. Thread 1016 is allocated cache partition 1036. Thread 1018 is allocated cache partition 1038. The portion of cache 1020 allocated to each of threads 1012-1018 executing within core 1010 may or may not be proportional to the number of executing threads, or the relative overhead required by each of the threads.

In FIG. 10, cache 1020 is a contested resource. That is, cache 1020 provides a limited quantity of cache memory. Each thread executing within core 1010 competes with other threads for available cache memory.

Given the same physical resources, on average, each of cache partitions 1032-1038 contain one fourth of the cache resources of a cache having only a single partition, such as cache 620 of FIG. 6, and one half of the cache resources of a cache having two partitions, such as cache 820 of FIG. 8. Therefore, each of partitions 1032-1038 will contain significantly less data and instructions than would either cache 620 of FIG. 6 or partitions 824-828 of cache 822 of FIG. 8. While core 1010 experiences an increase in compute due to better utilization of the pipelines, each of threads 1012-1018 experience an offsetting increase in cycle time due to an increased number of cache misses as compared to a single thread having an undivided larger cache, such as thread 612 and cache 620 of FIG. 6, and threads 812-814 and cache 822 of FIG. 8. The efficiency gained by the additional level of parallelism is therefore a balance between the increased utilization of the pipelines of the processor, and the decreased storage size of the cache that is allocated to threads executing on those pipelines.

Memory system 1000 includes memory management unit 1040. Memory management unit 1040 is a computer hardware component responsible for handling accesses to memory requested by core 1010. Memory management unit 1040 provides memory access protection and virtual-to-real memory address translation.

Memory management unit 1040 includes counter 1050. Counter 1050 is a counter that tracks a number of cache misses in cache 1020 over a period of time. In one illustrative embodiment, counter 1050 tracks the number of cache misses in L2 cache 1024 and L3 cache 1026 of cache 1020 over a predetermined time period. Each cache miss in L2 cache 1024 results in an elapse of more clock cycles as the requested data or instruction must be retrieved from L3 cache 1026. Each cache miss in L3 cache 1026 results in an elapse of more clock cycles as the requested data or instruction must be retrieved from even larger and slower main memory, such as a hard disk 150 of FIG. 1.

Cache misses as counted by counter 1050 are compared to count thresholds 1060. Count thresholds are upper count values and lower count values. Should the cache misses as counted by counter 1050 exceed either of the upper count values and lower count values of count threshold 1060, core 1010 can switch to a different level of parallelism.

For example, should the cache misses as counted by counter 1050 exceed the upper count value of count threshold 1060, core 1010 can remove layers of parallelism by switching from a higher SMT mode to a lower SMT mode. When the cache miss rate for L2 cache 1024 and L3 cache 1026 is high, memory management unit 1040 is likely to spend many clock cycles retrieving uncached memory pages from main memory. Therefore, overall computes may be increased by reducing parallelism and the contention for a contested resource. In this case, the number of parallel threads could be reduced, resulting in a larger cache size for the remaining threads, and a corresponding decrease in the number of cache misses due to the increased cache size available to the remaining threads.

Figure 11:
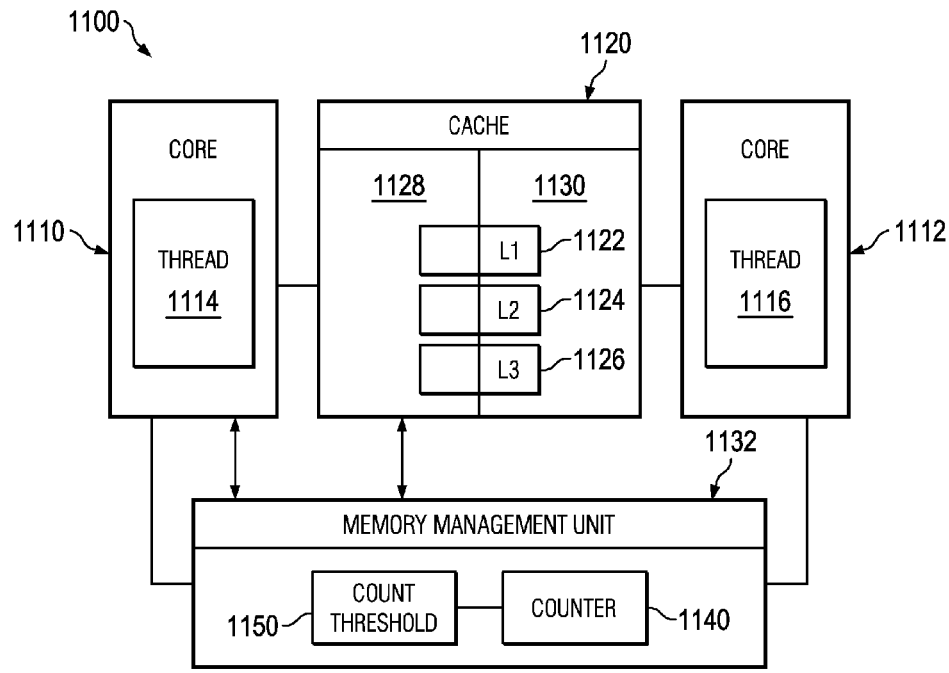
FIG. 11 is a data flow of a parallel processing system for a multiple core system according to an illustrative embodiment.

Referring now to FIG. 11, a data flow of a parallel processing system for a multiple core system is shown according to an illustrative embodiment. The parallel processing system 1100 of FIG. 11 is a parallel processing system, wherein each of core 1110 and core 1112 can execute one or more threads on a plurality of instruction pipelines within a processor, such as processor 500 of FIG. 5, processor 700 of FIG. 7, or processor 900 of FIG. 9.

Each of core 1110 and core 1112 is a relatively large, general-purpose logic function within a processor, such as processor 500 of FIG. 5, processor 700 of FIG. 7, or processor 900 of FIG. 9. Thread 1114 runs in core 1110. Thread 1116 runs in core 1112. While each of core 1110 and core 1112 is shown with only one thread, such a depiction is for illustrative purposes only. Each of core 1110 and core 1112 can be enabled to execute a plurality of threads in a variety of SMT modes, such as illustrated by processor 700 of FIG. 7, and processor 900 of FIG. 9. Each of thread 1114 and thread 1116 is a sequence of code, this code is often responsible for one aspect of the program, or one task given to the program. Each of thread 1114 and thread 1116 is a portion of a process that can run independently of, and concurrently with, other portions of that process. Each process is made of one or more threads.

Cache 1120 is associated with both core 1110 and core 1112. Cache 1120 is a cache such as instruction cache 314 and to data cache 316 of FIG. 3. Cache 1120 may be comprised of multiple cache levels, such as for example, but not limited to, L1 cache 1122, an L2 cache 1124, and an L3 cache 1126.

Each of core 1110 and core 1112, in conjunction with thread 1114 and thread 1116, is allocated a portion of cache 1120, including a portion of each of the multiple cache levels. Each of threads 1114-1116 is then allocated a portion of the cache assigned to its respective core. Thread 1114 is allocated cache partition 1128, while thread 1116 is allocated cache partition 1130.

In FIG. 11, cache 1120 is a contested resource. That is, cache 1120 provides a limited quantity of cache memory. Core 1110 competes with core 1112 for available cache memory.

Given the same physical resources, on average, each of core 1110 and core 1112 is allocated half of the cache resources of a system having only a single core, such as memory system 600 of FIG. 6. Each of cache partitions 1128-1130 will contain significantly less data and instructions than would an unpartitioned cache, such as cache 620 of FIG. 6. While parallel processing system 1100 experiences an increase in compute due to the multiple cores operating in parallel, each of threads 1114-1116 experience an offsetting increase in cycle time due to an increased number of cache misses as compared to a single thread having an undivided larger cache, such as thread 612 and cache 620 of FIG. 6. The efficiency gained by the additional level of parallelism is therefore a balance between the increased processing of multiple cores, and the decreased storage size of the cache that is allocated to threads executing on those cores.

Parallel processing system 1100 includes memory management unit 1132. Memory management unit 1132 is a computer hardware component responsible for handling accesses to memory requested by core 1110 and core 1112. Memory management unit 1132 provides memory access protection and virtual-to-real memory address translation.

Memory management unit 1132 includes counter 1140. Counter 1140 is a counter that tracks a number of cache misses in L1 cache 1122 over a period of time. In one illustrative embodiment, counter 1140 tracks the number of cache misses in L2 cache 1124 and L3 cache 1126 of cache 1120 over a predetermined time period. Each cache miss in L2 cache 1124 results in an elapse of more clock cycles as the requested data or instruction must be retrieved from L3 cache 1126. Each cache miss in L3 cache 1126 results in an elapse of more clock cycles as the requested data or instruction must be retrieved from even larger and slower main memory, such as a hard disk 150 of FIG. 1.

Cache misses as counted by counter 1140 are compared to count threshold 1150. Count thresholds are upper count values and lower count values. Should the cache misses as counted by counter 1140 exceed either of the upper count values and lower count values of count threshold 1150, one of core 1110 and core 1112 can be disabled or enabled, thus switching to a different level of parallelism.

For example, should the cache misses as counted by counter 1140 exceed the upper count value of count threshold 1150, parallel processing system 1100 can remove layers of parallelism by disabling one of core 1110 or core 1112. When the cache miss rate for L2 cache 1124 and L3 cache 1126 is high, memory management unit 1132 is likely to spend many clock cycles retrieving uncached memory pages from main memory. Therefore, overall computes may be increased by reducing parallelism and the contention for a contested resource. In this case, the number of parallel cores could be reduced, resulting in a larger cache size for the remaining cores, and a corresponding decrease in the number of cache misses due to the increased cache size available to the remaining threads.

Figure 12:
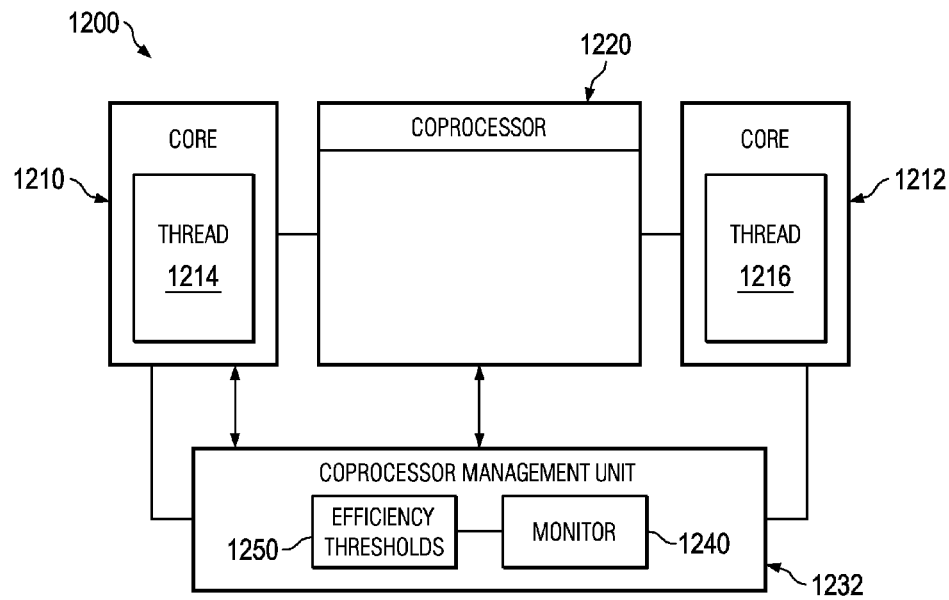
FIG. 12 is a data flow of a parallel processing system for a multiple core system accessing a contested coprocessor according to an illustrative embodiment.

Referring now to FIG. 12, a data flow of a parallel processing system for a multiple core system accessing a contested coprocessor is shown according to an illustrative embodiment. The parallel processing system 1200 of FIG. 12 is a parallel processing system, wherein each of core 1210 and core 1212 can execute one or more threads on a plurality of instruction pipelines within a processor, such as processor 500 of FIG. 5, processor 700 of FIG. 7, or processor 900 of FIG. 9.

Each of core 1210 and core 1212 is a relatively large, general-purpose logic function within a processor, such as processor 500 of FIG. 5, processor 700 of FIG. 7, or processor 900 of FIG. 9. Thread 1214 runs in core 1210. Thread 1216 runs in core 1212. While each of core 1210 and core 1212 is shown with only one thread, such a depiction is for illustrative purposes only. Each of core 1210 and core 1212 can be enabled to execute a plurality of threads in a variety of SMT modes, such as illustrated by processor 700 of FIG. 7, and processor 900 of FIG. 9. Each of thread 1214 and thread 1216 is a sequence of code, this code is often responsible for one aspect of the program, or one task given to the program. Each of thread 1214 and thread 1216 is a portion of a process that can run independently of, and concurrently with, other portions of that process. Each process is made of one or more threads.

Coprocessor 1220 is associated with both core 1210 and core 1212. Coprocessor 1220 is a computer processor, such as processor 310 of FIG. 3, used to supplement the functions of the primary processor. Operations performed by Coprocessor 1220 may be for example, but not limited to, floating point arithmetic, graphics, signal processing, string processing, Savitsky-Golay derivation, or encryption. By off-loading processor-intensive tasks from the main processor, Coprocessor 1220 can accelerate system performance.

Each of core 1210 and core 1212, in conjunction with thread 1214 and thread 1216, off-loads operations to coprocessor 1220. Depending on the workload of coprocessor 1220, thread 1214 or thread 1216 might have to wait several cycles for a required result before thread 1214 or thread 1216 can proceed to a subsequent execution stage.

In FIG. 12, coprocessor 1220 is a contested resource. That is, coprocessor 1220 provides a limited processing capability to which operations can be off-loaded. Core 1210 competes with core 1212 for processing capabilities of coprocessor 1220.

Parallel processing system 1200 may experience an increase in compute due to the availability of coprocessor 1220 to handle off-loaded operations. However, as the number of off-loaded operations increases, threads executing within core 1210 and core 1212 may experience an increased wait time for the results of the off-loaded operations. When this occurs, an increase in computes may be realized by performing the operations within the core, such as core 1210 and core 1212, instead of off-loading the operations to coprocessor 1220. The efficiency gained by the additional level of parallelism afforded by coprocessor 1220 is therefore a balance between the increased processing by coprocessor 1220, and the increased overhead experienced by core 1210 and core 1212 in off-loading the operations to coprocessor 1220.

Parallel processing system 1200 includes coprocessor management unit 1232. Coprocessor management unit 1232 is a computer hardware component responsible for handling accesses to coprocessor 1220 requested by core 1210 and core 1212.

Coprocessor management unit 1232 includes monitor 1240. Monitor 1240 is a device that tracks an efficiency of off-loaded operations to coprocessor 1220 over a period of time. For example, monitor 1240 can be, for example but not limited to, a counter that counts a number of clock tics required to execute an offloaded operation, a timer that tracks a time spent waiting in an instruction queue or data queue for coprocessor 1220, and a timer that tracks idle time within core 1210 and core 1212 that is spent waiting on results from coprocessor 1240.

Coprocessor efficiency as determined by monitor 1240 are compared to efficiency thresholds 1250. Efficiency thresholds are upper count values and lower count values. Should the coprocessor efficiency as determined by monitor 1240 exceed either of the upper count values and lower count values of efficiency thresholds 1250, access to coprocessor 1220 by one or more of core 1210 and core 1212 can be disabled or enabled, thus switching to a different level of parallelism.

For example, should the coprocessor efficiency as determined by monitor 1240 exceed an upper count value of efficiency threshold 1250, parallel processing system 1200 can remove layers of parallelism by disabling access by one of core 1210 or core 1212 to coprocessor 1220. Therefore, overall computes may be increased by reducing parallelism and the contention for a contested resource. In this case, the number of parallel operations offloaded to coprocessor 1220 could be reduced.

Figure 13:
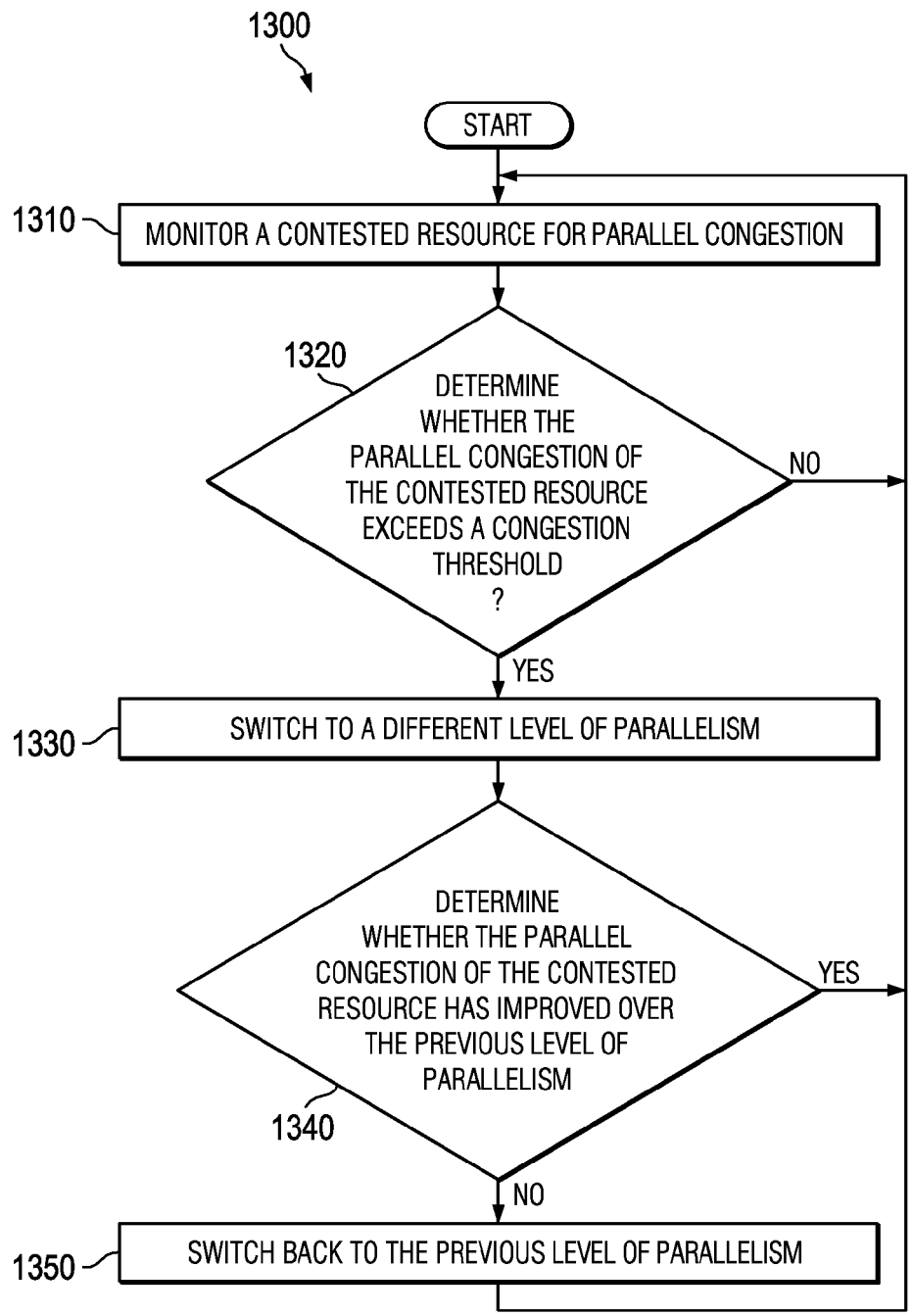
FIG. 13 a flowchart of the processing steps for monitoring and switching levels of parallelism in which illustrative embodiments may be implemented.

Referring now to FIG. 13, a flowchart of the processing steps for monitoring and switching levels of parallelism is shown in which illustrative embodiments may be implemented. Process 1300 is a hardware assisted process occurring within a processor, such as processor 310 of FIG. 3, in connection with a parallelism monitoring unit, such as the memory systems of FIG. 6, FIG. 8, and FIG. 10.

Process 1300 begins by monitoring a contested resource for parallel congestion (step 1310). A contested resource is a hardware or software component available in a limited quantity, which is required by each parallel process. Parallel processes therefore compete for the contested resource. The contested resource can be, for example, but not limited to, the size of an assigned cache partition, such as cache partitions 824-828 of FIG. 8, and cache partitions 1032-1038 of FIG. 10. The contested resource can also be, for example, but not limited to, a time slice for delegated processing on coprocessor.

Parallel congestion is a process inefficiency that occurs in the contested resource that may lead to parallel slowdown. Parallel congestion can be, for example but not limited to, a number of cache misses recorded over a predetermined time period, such as recorded by counter 640 of FIG. 6, counter 840 of FIG. 8, and counter 1050 of FIG. 10. Parallel congestion can also be, for example but not limited to, the amount of time a delegated process takes to execute on a coprocessor.

Process 1300 then determines whether the parallel congestion of the contested resource exceeds a congestion threshold (step 1320). The congestion threshold is a predetermined upper threshold, lower threshold, or both, of parallel congestion within the contested resource. The congestion threshold can be, for example, but not limited to, count threshold 650 of FIG. 6, count threshold 850 of FIG. 8, and count threshold 1060 of FIG. 10.

Responsive to determining that the parallel congestion of the contested resource does not exceed a congestion threshold ("no" at step 1320), process 1300 iterates back to step 1310. Process 1300 continues to monitor the contested resource.

Responsive to determining that the parallel congestion of the contested resource does exceed a congestion threshold ("yes" at step 1320), process 1300 switches to a different level of parallelism (step 1330). This switching of levels of parallelism can be, for example, but not limited to, enabling or disabling processor cores that share resources with other processor cores. These other resources can be, for example, but not limited to, processor cache. These other resources can be, for example, but not limited to coprocessors responsible for delegated activities.

In one illustrative embodiment, levels of parallelism are a number of threads executing in an SMT mode, and the parallel congestion is measured by identifying a cache miss rate in the L2 and L3 caches. Should the cache misses, as counted by a counter, exceed the lower count value of the count threshold, a core can add additional layers of parallelism by switching from a lower SMT mode to a higher SMT mode. When the cache miss rate for the L2 cache and the L3 cache is low, a core likely is able to effectively utilize additional levels of parallelism resulting in an increase in overall computes. Competition for the contested resource among the existing levels of parallelism is not hampering throughput. Therefore, overall computes may be increased by increasing parallelism and the contention for a contested resource. In this case, the number of parallel threads could be increased, resulting in a better pipeline utilization for the existing threads and additional threads. The increased pipeline utilization could offset the increased number of cache misses due to the decreased cache size available to the increased number of threads.

Contrarily, should the cache misses, as counted by a counter, exceed the upper count value of count threshold, a core can remove layers of parallelism by switching from a higher SMT mode to a lower SMT mode. When the cache miss rate for the L2 cache and the L3 cache is high, a memory management unit is likely to spend many clock cycles retrieving uncached memory pages from main memory. Therefore, overall computes may be increased by reducing parallelism and the contention for a contested resource. In this case, the number of parallel threads could be reduced, resulting in a larger cache size for the remaining threads, and a corresponding decrease in the number of cache misses due to the increased cache size available to the remaining threads.

Responsive to switching to a different level of parallelism, process 1300 then determines whether the parallel congestion of the contested resource has improved over the previous level of parallelism (step 1340). If the parallel congestion of the contested resource has improved, then the new parallelism level is more efficient than the previous level. However, if the parallel congestion of the contested resource has not improved or has worsened, the previous parallelism level was actually more efficient than the new setting.

Responsive to identifying that the total number of processed transactions per second has increased, ("yes" at step 1340), process 1300 returns to step 1310. Process 1300 then continues to monitor the contested resource.

Responsive to identifying that the total number of processed transactions per second has decreased, ("no" at step 1340), process 1300 switches back to the previous level of parallelism (step 1350). Because the number of processed transactions per second has decreased, the previous parallelism level was actually more efficient than the new setting.

Process 1300 then returns to step 1310. Process 1300 then continues to monitor the contested resource.

Thus, the illustrative embodiments as described herein provide a method for optimizing parallel processes by monitoring the congestion levels in contested resources. A contested resource is monitored for parallel congestion. If the parallel congestion of the contested resource exceeds a congestion threshold, the process switches to a different level of parallelism. The efficiency of the new level of parallelism is compared to the efficiency of the previous level of parallelism. If the new level of parallelism is not more efficient than the previous level of parallelism, the process returns to the previous level of parallelism.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-readable medium having a computer program product encoded thereon for managing an execution mode for a parallel processor, the computer program product comprising:
    instructions for identifying a first efficiency rate for a first contested resource of the parallel processor operating in a first operating mode;
    instructions, responsive to identifying the first efficiency rate for the first contested resource, for identifying whether the first efficiency rate for the contested resource of the parallel processor operating in the first operating mode exceeds a threshold; and
    instructions, responsive to identifying that the efficiency rate for the contested resource exceeds the threshold, for changing an operation of the parallel processor to a second operating mode.

2. The computer-readable medium of claim 1, wherein the computer program product further comprises:
- instructions for identifying a second efficiency rate for the first contested resource of the parallel processor operating in a second operating mode;
- instructions, responsive to identifying the second efficiency rate for the first contested resource of the parallel processor operating in the second operating mode, for identifying whether the second efficiency rate exceeds the first efficiency rate; and
- instructions, responsive to identifying that the second efficiency rate exceeds the first efficiency rate, for changing the operation of the parallel processor to the first operating mode.

3. The computer-readable medium of claim 2, wherein the instructions for identifying the first efficiency rate for the first contested resource of the parallel processor operating in the first operating mode further comprises:
- instructions for identifying the first efficiency rate for the first contested resource of the parallel processor operating in the first operating mode, wherein the parallel processor is a simultaneous multi-threaded processor.

4. The computer-readable medium of claim 3, wherein the instructions for identifying the first efficiency rate for the first contested resource of the parallel processor operating in the first operating mode further comprises:
- instructions for identifying the first efficiency rate for the first contested resource of the parallel processor operating in the first operating mode, wherein the contested resource is a cache allocated to a plurality of threads of the simultaneous multi-threaded processor, wherein the first efficiency rate is a cache miss rate of an L2 cache and an L3 cache of the simultaneous multi-threaded processor.

5. The computer-readable medium of claim 2, wherein the instructions for identifying the first efficiency rate for the first contested resource of the parallel processor operating in the first operating mode further comprises:
- instructions for identifying the first efficiency rate for the first contested resource of the parallel processor operating in the first operating mode, wherein the parallel processor is a multi core processor.

6. The computer-readable medium of claim 5, wherein the instructions for identifying the first efficiency rate for the first contested resource of the parallel processor operating in the first operating mode further comprises:
- instructions for identifying the first efficiency rate for the first contested resource of the parallel processor operating in the first operating mode, wherein the contested resource is the cache allocated to a plurality of cores of the multi core processor, wherein the first efficiency rate is a cache miss rate of an L2 cache and an L3 cache of the multi core processor.

7. The computer-readable medium of claim 5, wherein the instructions for identifying the first efficiency rate for the first contested resource of the parallel processor operating in the first operating mode further comprises:
- instructions for identifying the first efficiency rate for the first contested resource of the parallel processor operating in the first operating mode, wherein the contested resource is a coprocessor, wherein the first efficiency rate is selected from the group consisting of a time that an off-loaded instruction remains in a queue of the coprocessor, a time of execution of the off-loaded instruction by the coprocessor, and a time that a core of the multi core processor is idle.

8. A data processing system comprising:
- a storage having a computer program product encoded thereon for managing an execution mode for a parallel processor;
- a bus connecting the storage to a processor; and
- a processor, wherein the processor executes the computer program product: to identify a first efficiency rate for a first contested resource of the parallel processor operating in a first operating mode; responsive to identifying the first efficiency rate for the first contested resource, to identify whether the first efficiency rate for the contested resource of the parallel processor operating in the first operating mode exceeds a threshold; and responsive to identifying that the efficiency rate for the contested resource exceeds the threshold, to change an operation of the parallel processor to a second operating mode.

9. The data processing system of claim 8, wherein the processor further executes the computer program product:
- to identify a second efficiency rate for the first contested resource of the parallel processor operating in a second operating mode; responsive to identifying the second efficiency rate for the first contested resource of the parallel processor operating in the second operating mode, to identify whether the second efficiency rate exceeds the first efficiency rate; and responsive to identifying that the second efficiency rate exceeds the first efficiency rate, to change the operation of the parallel processor to the first operating mode.

10. The data processing system of claim 9, wherein the processor executing the computer program product to identify the first efficiency rate for the first contested resource of the parallel processor operating in the first operating mode further comprises the processor executing the computer program product:
- to identify the first efficiency rate for the first contested resource of the parallel processor operating in the first operating mode, wherein the parallel processor is a simultaneous multi-threaded processor.

11. The data processing system of claim 10, wherein the processor executing the computer program product to identify the first efficiency rate for the first contested resource of the parallel processor operating in the first operating mode further comprises the processor executing the computer program product:
- to identify the first efficiency rate for the first contested resource of the parallel processor operating in the first operating mode, wherein the contested resource is a cache allocated to a plurality of threads of the simultaneous multi-threaded processor, wherein the first efficiency rate is a cache miss rate of an L2 cache and an L3 cache of the simultaneous multi-threaded processor.

12. The data processing system of claim 9, wherein the processor executing the computer program product to identify the first efficiency rate for the first contested resource of the parallel processor operating in the first operating mode further comprises the processor executing the computer program product:
- to identify the first efficiency rate for the first contested resource of the parallel processor operating in the first operating mode, wherein the parallel processor is a multi core processor.

13. The data processing system of claim 12, wherein the processor executing the computer program product to identify the first efficiency rate for the first contested resource of the parallel processor operating in the first operating mode further comprises the processor executing the computer program product:

to identify the first efficiency rate for the first contested resource of the parallel processor operating in the first operating mode, wherein the contested resource is the cache allocated to the plurality of cores of the multi core processor, wherein the first efficiency rate is the cache miss rate of an L2 cache and an L3 cache of the multi core processor.

14. The data processing system of claim 12, wherein the processor executing the computer program product to identify the first efficiency rate for the first contested resource of the parallel processor operating in the first operating mode further comprises the processor executing the computer program product:

to identify the first efficiency rate for the first contested resource of the parallel processor operating in the first operating mode, wherein the contested resource is the coprocessor, wherein the first efficiency rate is selected from the group consisting of a time that an off-loaded instruction remains in a queue of the coprocessor, a time of execution of the off-loaded instruction by the coprocessor, and a time that the core of the multi core processor is idle.

* * * * *